United States Patent [19]

Böhme et al.

[11] 3,852,223

[45] Dec. 3, 1974

[54] PROCESS FOR DISPOSING OF HALOGEN-CONTAINING PLASTICS

[75] Inventors: Reinhard D. Böhme, Burr Ridge, Ill.; Ritchie A. Wessling, Midland, Mich.

[73] Assignee: The Dow Chemical Company, Midland, Mich.

[22] Filed: July 3, 1972

[21] Appl. No.: 268,466

[52] U.S. Cl. .......... 260/2.3, 117/124 E, 117/132 R, 260/91.7, 260/92.8 A, 260/94.1, 260/96 D, 260/654
[51] Int. Cl. .......................... C08f 47/24, C08f 9/00
[58] Field of Search.............. 260/2.3, 92.8 A, 96 D, 260/94.1, 91.7

[56] References Cited
UNITED STATES PATENTS

| | | | |
|---|---|---|---|
| 2,157,997 | 5/1939 | Brous | 260/92.8 A |
| 2,304,637 | 12/1942 | Hardy | 260/92.8 A |
| 3,716,339 | 2/1973 | Shigaki | 260/96 D |

OTHER PUBLICATIONS

Chem. Abstract, Volume 67, 1967, page 3033, Item No. 32268t.
Chem. Abstract, Volume 71, (1969), page 22, Item No. 125150w Dehydrochlorination of Chlorinated Polyacetylene.

*Primary Examiner*—Wilbert J. Briggs, Sr.
*Attorney, Agent, or Firm*—Ronald G. Brookens

[57] ABSTRACT

A process for disposing of halogen-containing plastic comprising preheating such plastic at dehydrohalogenating temperatures in the presence of a catalytic amount of a Lewis acid and recovering the halogen-containing by-products.

4 Claims, No Drawings

PROCESS FOR DISPOSING OF HALOGEN-CONTAINING PLASTICS

BACKGROUND OF THE INVENTION

The use of halogen-containing plastics such as polychloroprene, polyvinyl chloride and polymers of vinylidene chloride has increased rapidly in recent years. One of the major advantages of these plastics is that they may be discarded and incinerated after use. It has been reported in the Jan. 27, 1968 issue of Chemical Week that the Battelle Memorial Institute estimates 0.5 percent of the municipal wastes in the United States to be halogen-containing plastics. This amount is expected to increase to over 1 percent by 1976. Most municipal wastes are burned in incinerators, with the combustion of the halogen-containing plastics resulting in the halogens being released, usually in the form of the hydrogen halide. Such combustion products are undesirable due to the air pollution and corrosion which they cause.

Attempts have been made to reduce the amount of halogen emission by passing the combustion gases of the halogen-containing plastic through screens loaded with solid sodium carbonate. These attempts have met with some success, however, such a method does not provide for the recovery of useful products from the plastics being disposed of. British Pat. No. 1,245,556 sets forth a process for the incineration of chlorine-containing plastics wherein the plastic is first preheated to dehydrohalogenate the same, the hydrogen halide is collected and the residual material incinerated. The present invention represents an improvement in such process whereby significantly lower preheating temperatures can be used and wherein halogen-containing by-products, other than hydrogen halide, are produced which products are capable of forming useful carbonaceous products.

SUMMARY OF THE INVENTION

The present invention is an improved process for disposing of halogen-containing plastics wherein the plastic is first heated to dehydrohalogenation temperatures in the presence of catalytic amounts of a Lewis acid to form halogen-containing products which may be collected, e.g., by extraction with an organic solvent, and subsequently carbonized to form highly useful articles. Such process significantly reduces the amount of hydrogen halide passed into the atmosphere.

DETAILED DESCRIPTION OF THE INVENTION

The halogen-containing plastics which may be conveniently and economically disposed of by the process comprising the present invention include any such plastic which is capable of dehydrohalogenation at temperatures below about 160°C., in the presence of catalytic amounts of a Lewis acid. The invention is particularly adapted for the disposal of polymers containing predominant amounts of vinylidene chloride, e.g., the copolymers of vinylidene chloride and vinyl chloride, and especially the normally crystalline copolymers of vinylidene chloride and vinyl chloride as well as polyvinylidene chloride.

The preheat temperature advantageously employed generally must be at least about 70°C. to provide a sufficiently rapid rate of dehydrohalogenation. Temperatures above about 160°C. may be utilized but are generally unnecessary due to the catalytic effect of the Lewis acid constituent.

The Lewis acids which may be advantageously used include ferric chloride, zinc chloride and aluminum chloride with ferric chloride generally being preferred. Such materials may be present in a wide range of concentrations, however, amounts of at least about 1 mole of Lewis acid per 1000 moles of halogen-containing polymer is generally required to provide a sufficiently rapid rate of dehydrohalogenation. It is to be understood that the Lewis acids may be used as such or may be formed during the preheating step. Thus, the instant invention contemplates the reclamation of mixtures of scrap plastic and scrap metals wherein such materials are comixed over a wide range of concentrations.

As discussed supra, the use of the Lewis acid component permits the utilization of relatively low preheat temperatures and, in addition, forms useful halogen-containing by-products which may be collected, e.g., by extraction in a suitable organic solvent. Such halogen-containing by-products may be used to form carbonaceous coatings, conductive coatings and films, carbon films and fibers, intumescent coatings, carbon foams and the like.

The process of the present invention may be carried out under air but the use of vacuum or an inert atmosphere has been found to provide a greater yield of the useful halogen-containing by-products. Further, it is possible that the total amount of halogen-containing plastic can be converted to useful halogen-containing by-products, thereby precluding the need for incineration of insoluble residual materials.

The following examples will serve to further illustrate the present invention:

EXAMPLE I

In each of a series of experiments, polyvinylidene chloride was admixed with ferric chloride or zinc chloride where the Lewis acid was present either as a dry powder or in solution in an organic solvent therefore, i.e., methylene chloride or tetrahydrofuran. Where a solvent was employed, it was removed under vacuum prior to preheating the halogen-containing polymer. In each experiment, the mixture of polymer and Lewis acid was degassed at room temperature. The coated, degassed polyvinylidene chloride was then placed under vacuum in a bath at 100°C. or higher and degraded. With sufficient catalyst present, e.g., Lewis acid/vinylidene chloride is 1/100-1000 on a molar basis, the degradation at 100°C. proceeded within minutes to 50 to 60 percent completion, i.e., 50 to 60 percent of the total HCl in the polymer has been evolved. Under these conditions, significant amounts of 1.3.5 trichlorobenzene, tetrachlorostyrene, higher chlorinated aromatics and a linear, soluble conjugated polymer of chloroacetylene was formed. These products were removed by extraction in an organic solvent, i.e., toluene, tetrahydrofuran or trichlorobenzene, prior to ignition of any insoluble residue.

EXAMPLE II

Fifty (50) grams of polyvinylidene chloride powder were added to a two-liter flask. Four hundred (400) ml. of 1,2,4-trichlorobenzene (TCB) were then added to form a slurry. The slurry was stirred and purged with $N_2$. Two and one-half (2.5) grams $FeCl_3$ together with fifty (50) cc. TCB were added. The mixture turned dark green then rapidly changed to maroon. It was heated quickly to 95°–100°C. After 625 Meq. of acid had evolved, the reaction was cooled and filtered to remove the insoluble residues, which were capable of being incinerated without introducing hydrogen chloride or excessive fly ash to the atmosphere. The solution collected at this point was black and viscous and contained significant amounts of a soluble polymeric product identified as being a low molecular weight polychloroacetylene.

The syrup obtained by removing the solvent was used to coat glass and steel panels. The product after drying at 110°C. in vacuo was a hard glossy jet black coating which did not burn under a Bunsen flame. When heated rapidly to ~400°C., the coatings foamed into a carbonaceous mass but did not ignite. The original coatings were nonconductive. On heating to 450°C., however, they decomposed to a highly conductive carbonaceous product.

In each of several additional experiments, the reaction time was varied to allow elimination of the equivalent of ~400 to 700 Meq. HCl. The products collected were soluble in TCB at room temperature and were of the nature as described above.

What is claimed is:

1. In the process of disposing of vinylidene chloride polymers by incineration wherein the polymer is preheated to dehydrohalogenation temperatures the improvement comprising the sequential steps of (1) preparing an admixture of vinylidene chloride polymer and catalytic amounts of a Lewis acid, (2) degassing said mixture, (3) heating said mixture under vacuum or in an inert atmosphere at a temperature of at least about 70°C. to produce a substantially linear, soluble, conjugated polymer of chloroacetylene among other chlorine-containing by-products, then (4) removing said polymer of chloroacetylene and said other halogen-containing by-products by extraction thereof in an organic solvent.

2. The process of claim 1 wherein said organic solvent is selected from the group consisting of toluene, tetrahydrofuran and trichlorobenzene.

3. The process of claim 2 wherein said Lewis acid is ferric chloride.

4. The process of claim 3 wherein said vinylidene chloride polymer is polyvinylidene chloride.

* * * * *